March 18, 1958 R. H. KAMPFER 2,827,152
BREAD COOLING CONVEYOR
Filed May 28, 1954 5 Sheets-Sheet 1
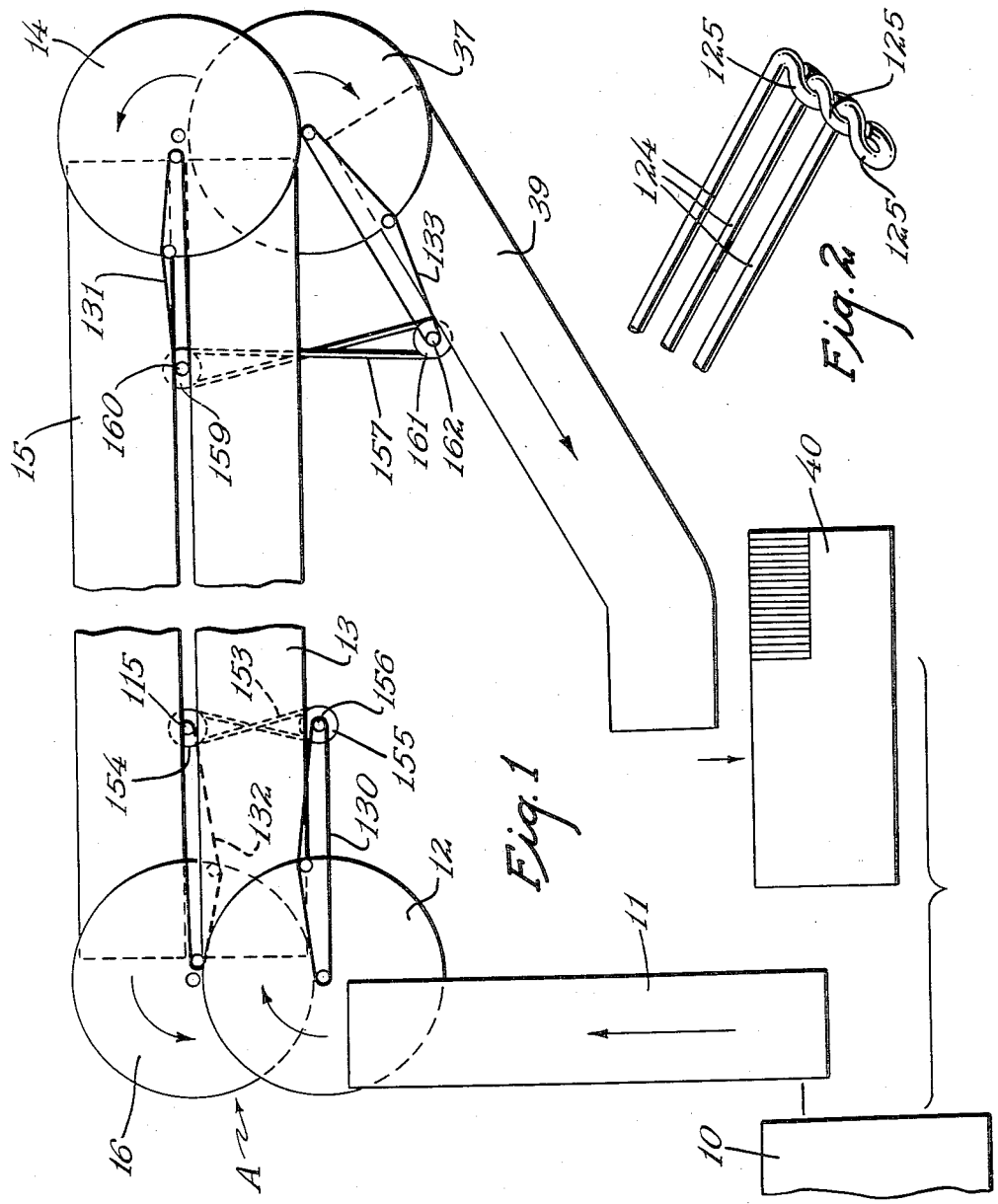
INVENTOR
Richard H. Kampfer
BY Robert M. Dunning
ATTORNEY March 18, 1958  R. H. KAMPFER  2,827,152
BREAD COOLING CONVEYOR
Filed May 28, 1954  5 Sheets-Sheet 2
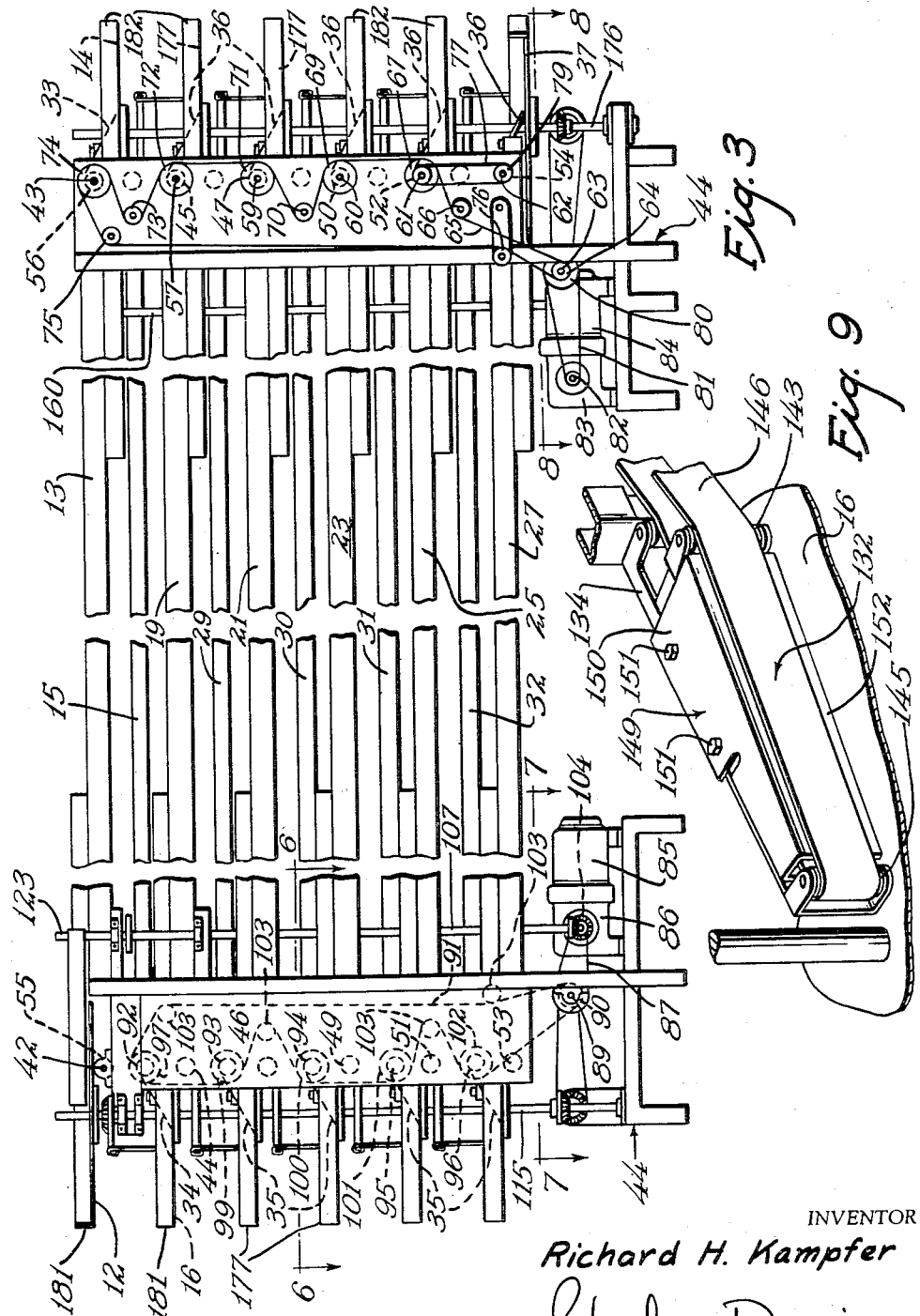
INVENTOR
Richard H. Kampfer
BY Robert M. Dunning
ATTORNEY

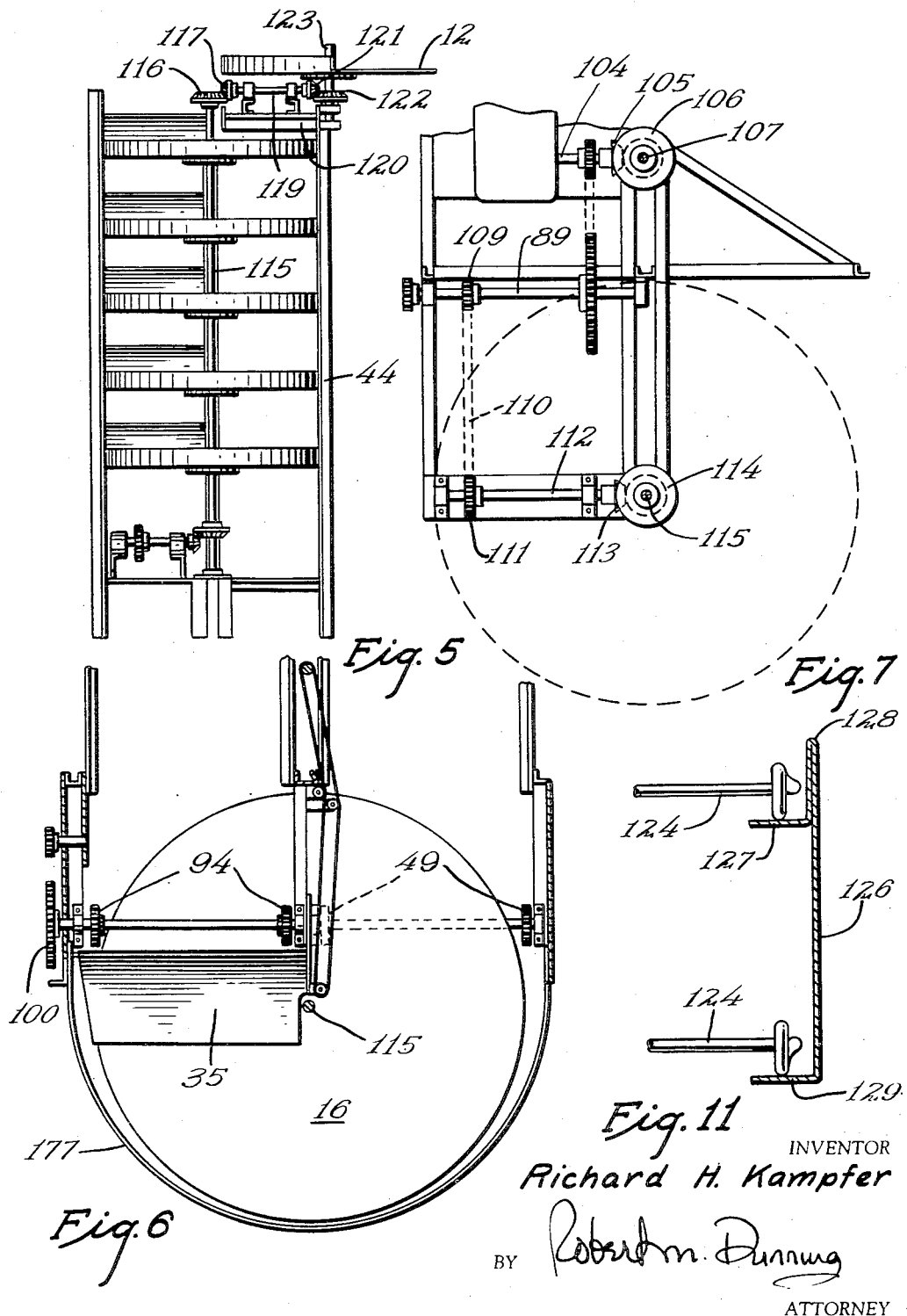

March 18, 1958  R. H. KAMPFER  2,827,152
BREAD COOLING CONVEYOR
Filed May 28, 1954  5 Sheets-Sheet 5

INVENTOR
Richard H. Kampfer
BY
ATTORNEY

United States Patent Office 2,827,152
Patented Mar. 18, 1958

2,827,152

BREAD COOLING CONVEYOR

Richard H. Kampfer, St. Paul, Minn., assignor to Conveyor Specialties Company, Ramsey County, Minn., a corporation Application May 28, 1954, Serial No. 433,197

16 Claims. (Cl. 198—34)

This invention relates to an improvement in cooling conveyors for bread and the like and deals particularly with a method and apparatus for gradually cooling baked products. Various devices have been provided for the gradual cooling of bakery products. In most such devices the bread is placed upon a conveyor which is usually elevated above the level of the machines and workers in the bakery and the conveyor is made sufficiently long so that the bread will be at the desired temperature when sliced and wrapped. This usually necessitates a conveyor of considerable length due to the fact that the bread is produced at a high rate of speed and as considerable time is required for cooling the bread.

This arrangement has several inherent difficulties. In the first place the bread when removed from the oven is immediately subjected to room temperature which tends to start the cooling operation more quickly than is desirable. Secondly, the conveyors are usually several hundred feet in length requiring considerable space and making it necessary for the bread to travel over a considerable area while being cooled. As a result the bread is more likely to be subjected to dust and dirt than would be the case if it were confined within a relatively small area. Furthermore, the cost of the conveyors, supporting the conveyors in elevated position, and maintaining the elevated conveyors is higher than in constructions where the conveyors are more readily accessible. The cost of operating the conveyors and maintaining them in operation is also high as separate motors must be provided at intervals through the length of the conveyor in order to drive the conveyor properly.

An object of the present invention lies in providing a cooling conveyor which eliminates most of the difficulty previously existing in devices of other types. In the present apparatus the conveyors are stacked in two parallel lines one above the other, the conveyors of one line travelling in one direction and the conveyors of the other line travelling in the opposite direction. As a result the bread is conveyed in an endless path from one end of the apparatus to the other and returned, the bread changing levels at each end of the apparatus. Thus, while the bread travels a distance sufficient to properly cool the same, it is at all times maintained within a compact area which can be kept clean and free of dust and dirt.

A feature of the present invention resides in the fact that the bread baked is first conveyed to the top of the conveying apparatus and travels along the uppermost conveyor, from one end to the other of the apparatus. The bread is then transferred to a return conveyor parallel to the first conveyor and at a slightly lower level. The bread is then transferred to a third conveyor which is positioned directly beneath the uppermost conveyor. This action continues until the bread travels to the end of the lowermost conveyor at which time it is at the proper temperature for slicing, wrapping and packaging.

This arrangement thus delivers the freshly baked bread to the part of the conveying apparatus which is normally at the highest temperature, due to the heat rising from the lower conveyor sections. This is of particular advantage because the bread temperature is reduced more gradually than would otherwise be possible. In other words, the method is comparable to placing the freshly baked bread in a room at high temperature and gradually reducing the temperature as the bread cools. This method increases the quality of the bread to a considerable extent.

A further feature of the present invention lies in forming the conveyors of spaced bars arranged in parallel relation and linked together at their ends. These bars travel at right angles to their longitudinal axis and carry the bread in such a manner that air may flow vertically through the conveyor to more effectively cool the bread. As the conveyors of each row are arranged in superimposed relation, the air is gradually heated by contact with the loaves of bread and obviously the bread upon the uppermost conveyors is contacted by warmer air than the bread on the lower conveyor sections.

A further feature of the present invention lies in a particular means and method of transferring the bread from one parallel conveyor to the other. As the bread reaches the end of each conveyor section, it is moved on an inclined chute onto a rotating disc. The end of the chute is arranged generally radially of the disc so that the transversely arranged loaves slide down the chute and onto the disc with the longitudinal axis of the loaves extending in a generally radial direction. A retarder preferably engages the upper surfaces of the loaves as they travel down the chute and onto the disc, this retarder being in the form of a flexible curtain which engages the forward edge of each loaf and tends to hold it at right angles to the direction of travel. This flexible curtain also tends to straighten the loaves if they have been previously twisted by slightly retarding the forward corner of an angled loaf until the rear edge swings into right angular direction of travel. This curtain may be made of wire mesh or similar material which may be maintained in a sanitary condition and which is heavy enough to produce the required retarding action without danger of deforming the loaves. The wire mesh is preferably of the type used for wire belting or the like.

An added feature of the present invention resides in the provision of a novel means of maintaining the loaves in proper parallel relation as they leave the conveyor. Each conveyor section terminates partially below the disc transferring the bread and with its outer edge substantially tangent to the disc. As a result the outer ends of the loaves engage the conveyor before the inner ends thereof producing a tendency to draw the loaves from the disc with the outer ends of the loaves foremost. Stated otherwise, the engagement of the ends of the loaves most remote from the axis of rotation with the conveyor section tends to rotate the loaves through 90° and draw them end first out of the conveyor. In order to prevent this difficulty, a short belt conveyor is provided supported on rollers with vertical axes, this belt conveyor extending sufficiently radially from the disc in the direction of travel of the conveyor section on which the loaves are to travel. This belt engages the ends of the loaves nearest the center of the disc and gently propels the loaves over the surface of the disc until the loaves are on the adjoining conveyor section. As a result both ends of the loaves are simultaneously conveyed and the loaves move onto the adjoining conveyor section in parallel relation with the longitudinal axes of the loaves transverse to the direction of travel.

An added feature of the present invention resides in the fact that the conveyor sections, the transferring discs, and the guiding belts may all be operated in timed relation by a pair of drive motors located at opposite ends of the apparatus. One motor acts to drive one series of transferring discs and one bank of conveyors while the other motor rotates the other set of transferring discs and the other bank of conveyors. Thus, the motors need not be accurately synchronized in order for the apparatus to function properly. In view of the fact that all of the conveyors move at a similar speed and are connected by suitable drive means to a single motor, the number of motors required for the conveying apparatus is materially reduced.

While the apparatus has been particularly described for use with loaves of bread, it is believed obvious that rolls or other baked materials may be similarly cooled. When the apparatus is used for smaller goods such as rolls, the belts which serve to properly position the loaves of bread may in this case serve as a means for insuring the conveyance of all of the rolls onto the adjoining conveyor. If the rolls travel on the disc until they engage the belt, the belt tends to impel them toward the conveyor. In such an instance a baffle is provided adjoining each of the belts to prevent the rolls from becoming caught between the lower edge of the belt and the disc.

A further feature of the present invention resides in the provision of a transferring disc which is offset from the remaining discs at the entrance end of the apparatus to transfer the bread from the entrance conveyor to the top conveyor section. A transferring disc is also provided adjoining the outlet end of the lowermost conveyor section to convey the cooled bread from the apparatus to the slicer or packaging apparatus.

These and other objects of novel features of my invention will be more clearly and fully set forth in the following specification and claims.

In the drawings forming a part of the specification:

Figure 1 is a diagrammatic plan view showing the general arrangement of the cooling apparatus.

Figure 2 is a perspective view showing a short section of one side of the conveyor mechanism.

Figure 3 is a side elevational view of the cooling apparatus, the input conveyor and output conveyor being eliminated.

Figure 5 is an end view of the inlet end of the apparatus.

Figure 6 is a sectional view through a portion of the apparatus, the position of the section being indicated by the line 6—6 of Figure 3.

Figure 7 is a sectional view through a portion of the drive mechanism, the position of the section being indicated by the line 7—7 of Figure 3.

Figure 9 is a perspective view of a portion of a guide belt used in conjunction with each conveyor section.

Figure 11 is a sectional view through a portion of the frame of the apparatus showing the support for the conveyor belt of one section.

Figure 4:
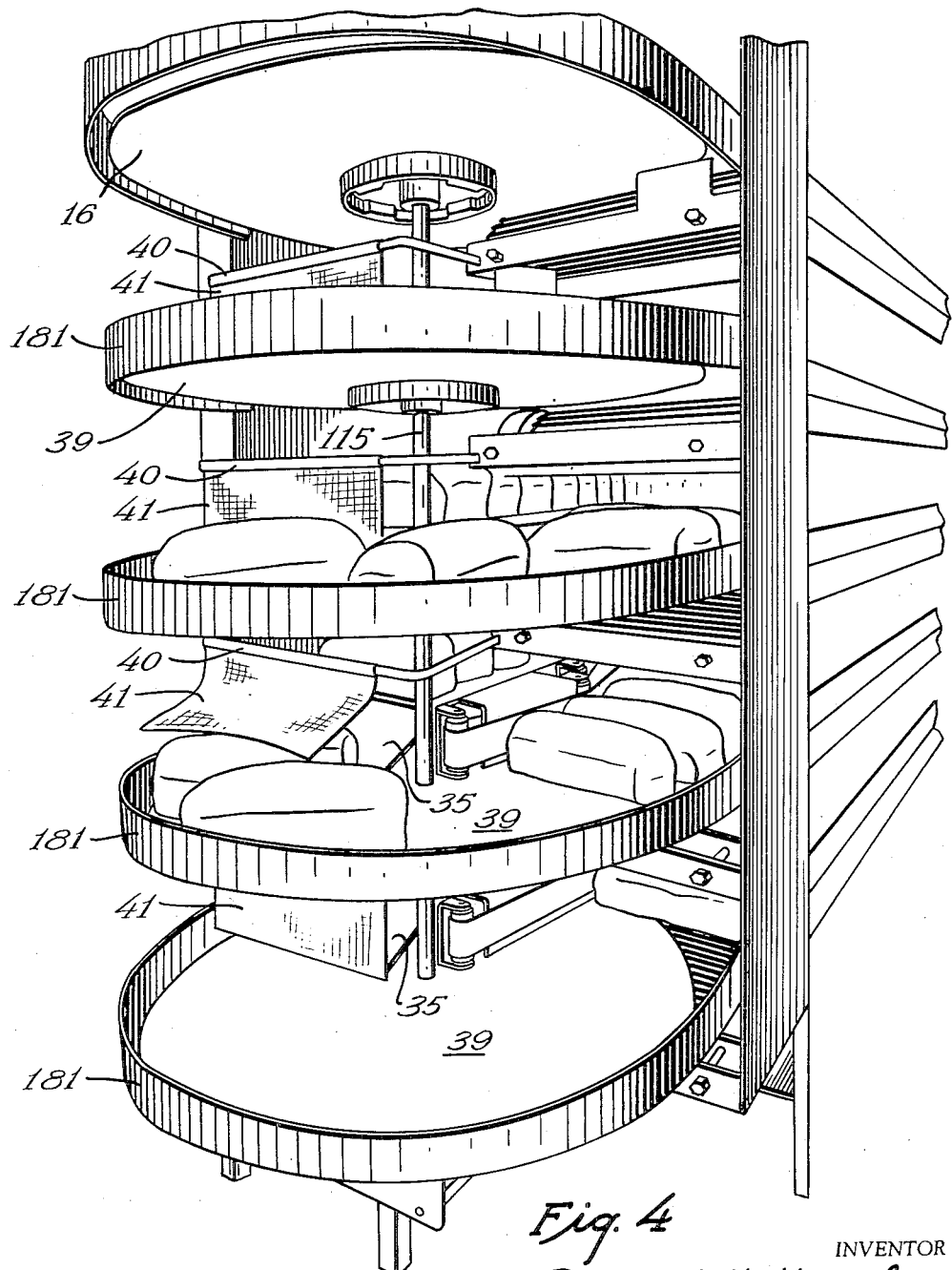
Figure 4 is a perspective view of a portion of the inlet end of the conveyor in operation.

The general arrangement of the apparatus is best illustrated in Figure 1 of the drawings. While the specific arrangement at the inlet and at the outlet may be varied, a typical installation is diagrammatically shown. The bread or other baker products is baked in an oven 10. Adjoining the oven is an inlet conveyor 11 which is not shown in detail, but which moves the bread upwardly and toward the cooling and conveying mechanism which is illustrated in general by the letter A.

The conveyor 11 delivers the bread to a top transfer disc 12 which delivers the bread to a top conveyor section 13. The conveyor 13 is of no necessary or desired length and delivers the bread to a transferring disc 14.

The disc 14 delivers the bread to a top conveyor 15 of a second conveyor bank which extends parallel to the first bank of conveyors which include the conveyor section 13 and a suitable number of sprocket conveyor sections which will be described. The conveyor 15 is also the uppermost of a series of superimposed conveyor sections which are similar in nature. The conveyor section 15 delivers the bread to a transfer disc 16 at the inlet end of the apparatus.

As is shown in Figure 3 of the drawings the cooling and conveying apparatus includes the conveyor sections 13, 19, 21, 23, 25 and 27 all of which are in superimposed relations and which travel in the same direction. The return conveyors are indicated by the numerals 15, 29, 30, 31 and 32. In the particular arrangement illustrated the bread enters the apparatus at one end and leaves it at the other so that one bank of conveyor sections includes one more section than in the bank of conveyor sections forming the reverse or returning conveyors.

As all of the sections are substantially similar in form they will not each be described in detail. It is believed sufficient to state that the transferring disc 12 is slightly above the level of the first conveyor section 13 and that this conveyor section delivers the bread to the transferring disc 14 which is sufficiently below the level of the conveyor 13 so that the bread may slide onto the disc 14 by means of a chute 33. The return conveyor 15 is almost on the line of the disc 14 but slightly below the same and transfers the bread to the disc 16 by means of a chute 34. Each conveyor section in turn has a similar outlet chute at the delivering end thereof, the chutes at one end of the apparatus being indicated by the numeral 35 and the chutes at the opposite end of the apparatus being indicated by the numeral 36. The chute 36 at the end of the lowermost conveyor section 27 delivers the bread to a disc 37 which is offset from the remaining transferring discs as shown in Figure 1 and acts to transfer the bread onto an outlet conveyor 39. Bread travelling on the conveyor 39 is delivered to a slicing apparatus 40 or to suitable wrapping or packaging means.

Figure 4 of the drawings illustrates the arrangement for retarding the loaves as they leave each conveyor section and slide onto a transferring disc. The transferring discs at this end of the conveyor apparatus are identified (with the exception of the uppermost discs) by the numeral 39. In Figure 4 may be seen certain of the chutes 35 which, as illustrated therein and in Figure 6, extend over the discs 39 to transfer bread from their respective conveyors onto each of the illustrated vertically aligned transferring discs 39 in the manner as described. A frame member 40 extends over the lower end of each chute 35 and acts to support a retarding device 41 which is preferably in the form of a flexible curtain suspended from each frame member 40. In the construction illustrated, the curtains 41 are formed of wire mesh or the like of the type which is used for wire belting. Such a curtain possesses considerable weight and yet is freely flexible and will swing over the tops of the loaves of bread as they move into the discs 39. If the loaves of bread are not in proper relation as they slide down the chute 35 the forward corner of the loaf strikes against the curtain and is retarded until the rear end of the loaf catches up, whereupon the loaf is drawn beneath the curtain with its longitudinal axis parallel to the curtain support 40. The curtain is properly constructed so that the weight thereof and the resistance provided thereby is not sufficient to deform the loaves of bread.

As is indicated in Figure 3, the uppermost conveyor is supported upon supporting shafts 42 and 43 mounted upon the frame 44 of the apparatus. The shafts 42 and 43 support suitable sprockets over which the endless conveyor 13 travels. In a similar manner the ends of the conveyor 19 are supported by sprockets 44' and 45; the ends of the conveyor 21 are supported by parallel sprockets 46 and 47; the ends of the conveyor 23 are supported by sprockets 49 and 50; the conveyor section 25 is supported upon sprockets 51 and 52; and the conveyor 32 is supported upon parallel sprockets 53 and 54.

The shafts 42 and 43 support sprockets 55 and 56 respectively. The sprockets 56, 45, 47, 50 and 52 and 54 are mounted in super-imposed relation and are provided with supporting shafts 43, 57, 59, 60 and 61 and 62 respectively. Pulleys or sprockets are mounted on each of the shafts, the shafts being supported by suitable bearings not specifically disclosed by the machine frame 44. A drive shaft 63 also supports a pulley or sprocket 64 on the same plane as the pulleys or sprockets of the sprocket shafts which have been described. A belt or chain 65 extends over the sprocket 64, an idle sprocket 66, a sprocket 67 on the shaft 61, a sprocket 69 on the shaft 60, an idle sprocket 70, a sprocket 71 on the shaft 59, a sprocket 72 on the shaft 57, an idle sprocket 73, a sprocket 74 on the shaft 43, and over idle sprockets 75 and 76. The idle sprockets are properly arranged so that the chain 65 will rotate all of the sprockets 67, 69, 71, 72 and 74 in the same direction. A short chain 77 connects a sprocket on the shaft 61 with a similar sprocket 79 on the shaft 62 to also rotate this shaft 62 in the same direction. Thus, it is believed apparent that upon rotation of the drive shaft 64, all of the conveyors will be moved in the same direction simultaneously.

The shaft 63 is provided with a sprocket 80 which is connected by a belt 81 to a suitable drive sprocket 82 on a speed reducing apparatus 83 connected to a drive motor 84. All of the shafts and drive mechanism are suitably supported upon the frame of the apparatus which is indicated in general by the number 44.

A similar drive arrangement is provided at the opposite end of the apparatus. The motor 85 and the speed reducing apparatus 86 connected thereto act through a belt 87 to operate a drive shaft 89. The drive shaft 89 is provided with a sprocket 90 which drives a chain 91 which passes over sprockets on the drive shafts of the various return conveyors. The return conveyors are provided with drive sprockets 92, 93, 94, 95 and 96 which rotate in unison with sprockets 97, 99, 100, 101 and 102 relatively. The chain 91 is guided by suitable idle pulleys 103 which act to rotate all of the return conveyors in a similar direction in unison.

As is indicated in Figure 7 of the drawings the motor drive shaft 104 is connected through beveled gears 105 and 106 to a vertical shaft 107 which extends upwardly between the banks of conveyors to drive the direction belts in a manner which will be later described.

The shaft 89 is provided with a sprocket 109 connected by a chain 110 to a cooperable sprocket 111 on a parallel shaft 112. Rotation of the shaft 112 acts through bevel gears 113 and 114 to drive a vertical shaft 115. The shaft 115 extends through the various discs 39 and 16 and acts to rotate these discs in unison.

From the foregoing description it will be seen that the single motor shaft acts to drive the various superimposed conveyor sections on one bank of conveyors and also to rotate the transferring discs. The drive also acts as will be later described through the shaft 107 to drive the various belts which control the position of the loaves as they leave the transferring discs. From Figure 5 of the drawings it will be noted that the disc rotating shaft 115 also rotates the uppermost transferring disc 12 which is offset from the discs 16 and 39.

A bevel gear 116 is mounted upon the upper end of the disc driving shaft 115 and cooperates with a bevel gear 117 to drive a horizontal shaft 119 mounted on a frame portion 120 connected to the frame 44. The shaft 119 acts through engaging cooperable gears 121 and 122 to rotate a vertical shaft 123 projecting above the remainder of the apparatus. The disc 12 is mounted upon the shaft 123 for rotation in conjunction therewith, the direction of rotation of the disc 12 being opposite the direction of rotation of the discs 16 and 39 on the shaft 115.

The conveyor sections which have been described are preferably composed of parallel rods such as are shown in Figure 2 and are designated by the numeral 124. The ends of the rods 124 are bent in angular relation and are formed into loops 125, each of which encircles the next adjoining rod 124. The loops 125 are offset inwardly as illustrated so as to encircle the next adjoining rod 124 closely adjacent to the points of bend. The loops are so arranged as to hold the rods 124 parallel but to allow desired angularity between the rods about the axes of the rods. Accordingly, the spaced rods 124 may straddle the teeth of their supporting sprockets at opposite ends, the conveyors being endless. Suitable means is provided at the ends of the conveyor sections opposite the driven ends thereof so that the conveyors may be kept in a taut condition.

As is indicated in Figure 11 of the drawings each conveyor section is provided with parallel side plates 126, one of which is shown in Figure 11, these side plates having spaced inwardly directed flanges 127 and 129 over which the edges of the conveyor may ride. The supporting side plates 126 extend above the level of the upper surface of the conveyor to provide a protective wall 128 to prevent any of the goods on the conveyor from being forced off the side of the conveyor. Means are provided for guiding the loaves from each transferring disc to the adjoining conveyor section. In Figure 1 of the drawings I disclose an auxiliary belt conveyor 130 which transfers the loaves from the uppermost disc 12 to the top conveyor section 13. A similar belt conveyor 131 is shown for transferring the loaves from the disc 14 to the conveyor section 15. In dotted outline a third belt conveyor 132 is shown for use in transferring the bread from the disc 16 to the next adjoining conveyor section 19. Also shown in Figure 1 is a belt conveyor 133 which is used to convey the loaves from the disc 37 to the outlet conveyor 39. In view of the fact that all of these conveyors are identical in form they are not all shown in detail. However, one such conveyor 132 is illustrated in Figures 9 and 10 of the drawings.

Figure 10:
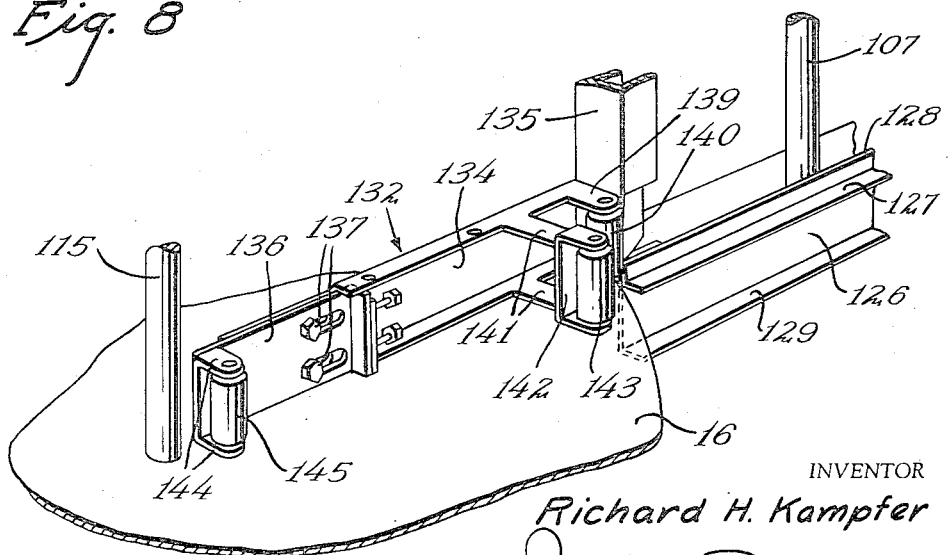
Figure 10 is a perspective view similar to Figure 9 with the belt and baffle removed therefrom.

As shown in Figure 10 a channel shaped member 134 is secured to and supported by a frame member 135 from a part of the frame 44. A strip 136 is arranged in telescoping relation to the channel 134 and is held in adjusted position by suitable means such as bolts 137. The channel member 134 is provided with parallel vertically spaced arms 139 which pivotally support a roller 140. The channel member 134 is also provided with vertically spaced arms 141 which support a U shaped bracket 142 which pivotally supports a roller 143. Vertically spaced arms 144 on the strip 136 support a roller 145.

As has been previously stated the drive shaft 104 acts to rotate a vertical shaft 107 which extends between the parallel banks of conveyor sections. A belt 146 which forms a part of the conveyor 132 encircles the shaft 107 and the roller 145. One belt side extends about the roller 143 and is guided thereby while the other belt side engages the opposite side of the roller 143 to guide the same. Upon rotation of the shaft 107 the belt 146 is driven in such a manner that the surface of the belt which is engageable with bread supported by the corresponding disc such as 16 travels in a direction to move the bread onto the adjoining conveyor section. This arrangement is extremely important as the bread tends to maintain its longitudinal axis in a generally radial direction with respect to the axis of rotation of the various discs. Accordingly, when the bread rotates to the extent necessary to cause the inner end of the loaf to engage the corresponding conveyor belt such as 146, this inner edge of the loaf is held from further rotation with the disc. This causes the outer edge of the loaf to move beyond the periphery of the transferring disc on which it is mounted and to engage the conveyor section which is immediately below this disc. As a result, the loaves of bread are guided properly onto the adjoining conveyor with both ends of the loaf at substantially right angles to the belt conveyor engaged.

If the bread is not guided in this manner and is held from further rotation upon the disc by a fixed member, the conveyor onto which the bread is disposed tends to pull the outer end of the loaf forwardly and to twist the loaf so that the longitudinal axis thereof extends parallel to the axis of movement. However, by engaging the moving belt the bread is moved from the disc so that the outer edge of each loaf engages the adjoining conveyor at just about the time the inner edge of the loaf is being propelled by the belt and about the time when the loaves are arranged at right angles to the direction of travel. As a result the loaves travel in parallel relation along the conveyor section and any slight angularity is corrected when the loaf passes down a chute at the opposite end of the conveyor and is rotated in movement by the curtain 41. As shown in Figure 9 of the drawings a baffle 149 is added adjoining each belt conveyor in the event the apparatus is to be used for cooling rolls or other smaller bakery products. The baffle 149 includes a horizontal flange 150 which overlies the uppermost flange of the channel 134 and is secured thereto by suitable means such as the bolts 151. The baffle 149 also includes a vertical flange 152 which extends parallel to the outer portion of the belt 146 between the rollers 145 and 143 and inwardly thereof. The lower edge of the baffle 152 extends closely adjacent the upper surface of the adjoining disc such as 16 and prevents the rolls or other objects from being wedged between the roller edge of the belt and the disc. Due to the fact that the belt 146 moves at substantially right angles to the direction of movement of the bakery goods upon the disc, there is otherwise a tendency for the edges of the rolls to be wedged and distorted, particularly in view of the fact that the rolls are soft and because the belt tends to vary somewhat in its distance between the disc and the lower edge of the belt. As is indicated in Figure 1 of the drawings the uppermost belt conveyor 130 is driven by a belt 153 which encircles a pulley 154 on the shaft 115 and encircles a pulley 155 on a parallel shaft 156. However, the action of the belt conveyor 130 is identical to that previously described and merely acts to guide bread from the offset disc 12 to the uppermost conveyor 13. Similarly a belt 157 connects a pulley 159 on the vertical shaft 160 to a pulley 161 on a parallel shaft 162. The shaft 160 corresponds to the shaft 115 at the opposite end of the apparatus as will be described. The conveyor 133 acts to convey the loaves onto the outlet conveyor 39.

Figure 8:
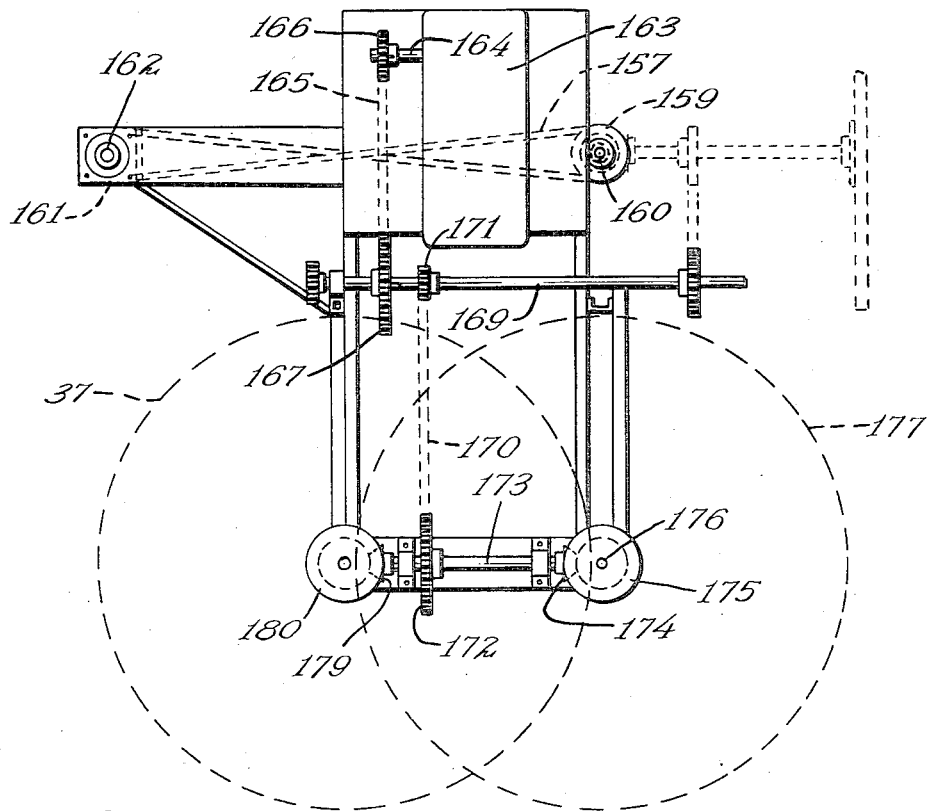
Figure 8 is a sectional view through a portion of the outlet end of the conveyor, the portion of the section being indicated by the line 8—8 of Figure 3.

The arrangement shown in Figure 8 of the drawings is practically identical with the arrangement previously described. The motor and gear reducing unit 163 operates a drive shaft 164 which acts through a belt 165 and cooperable sprockets 166 and 167 to drive a parallel center shaft 169. This shaft 169 is connected by a belt 170 engaging suitable sprockets 171 and 172 to a shaft 173. The shaft 173 is engaged by suitable bevel gears 174 and 175 to a vertical shaft 176 which extends through the disc 14 and the centric discs 177 spaced therebeneath. The shaft 173 also acts through bevel gears 179 and 180 to drive the offset disc 37. Thus, all of the discs which are at the outlet end of the apparatus are driven by a single motor and one bank of conveyors is also driven by this same motor in the manner which has been previously described.

From the foregoing explanation it will be understood that the entire apparatus includes two parallel banks of conveyors, one of which moves in one direction and the other of which moves in the opposite direction. One motor at one end of the apparatus operates one bank of conveyer sections, the transferring discs at this end of the apparatus, including the offset disc onto which the incoming bread is transferred. The outlet end of the apparatus is provided with a second motor which operates the second bank of conveyor sections, the transferring discs at this end of the sections, and the offset disc which transfers the bread leaving the apparatus onto the outlet conveyor.

Because of this particular arrangement of parts, the motors at opposite ends of the apparatus need not be entirely in synchronization. Due to the fact that the transfer belts are driven by the same motor that drives the conveyors onto which the bread is transferred and the discs which transfer the bread the bread is always properly handled even though one motor may be travelling at a slightly higher speed than the other. As is indicated in Figures 3 and 4 of the drawings the various discs are partially encircled by walls, the walls at one end of the apparatus being identified by the numeral 181 and the arcuate walls at the opposite end of the apparatus being indicated by the numeral 182. Thus, any tendency for the bread to slide outwardly during rotation of the discs is prevented although the speed of movement of the discs is not ordinarily sufficient to create any great tendency for the loaves to be moved outwardly by centrifugal force.

In accordance with the patent statutes, I have described the principles of construction and operation of my cooling conveyor and while I have endeavored to set forth the best embodiment thereof, I desire to have it understood that obvious changes may be made within the scope of the following claims without departing from the spirit of my invention.

I claim:

1. An apparatus for cooling bakery products including in combination parallel banks of conveyor sections consisting of a first series of superimposed conveyor sections travelling in the same direction, a second series of conveyor sections travelling in the opposite direction from the directions of travel of the first conveyors, rotating disc and conveyor guide transferring means for transferring products from a conveyor section of one bank to a conveyor section of the second bank, auxiliary conveyor and side conveyor guide means for conveying products to the uppermost conveyor section of one bank, auxiliary conveyor and conveyor guide means for conveying cooled products from the lowermost conveyor section of one bank, the rotating disc and conveyor guide transferring means being in series superimposed transferring the products from the uppermost conveyor sections to the lowermost conveyor sections.

2. An apparatus for cooling bakery products including in combination a series of conveyor sections arranged in superimposed relation and travelling in the same direction, a second series of conveyor sections arranged in parallel relation to the first bank and arranged in superimposed relation, the conveyors of the second bank travelling in the opposite direction from the direction of travel of the first conveyors, drive means for each series of conveyor sections, inclined chute, product retarder and conveyor guide means transferring the products from the ends of the conveyors of the first bank to the start of the conveyors of the second bank, additional inclined chute, product retarder and conveyor guide means transferring the products from the ends of the conveyors of the second bank to the start of the next lower conveyors of the first bank, off-set auxiliary horizontal conveyor and product supply guide means conveying products to the uppermost conveyor section of the first bank and off-set auxiliary conveyor means delivering the products from the lowermost section of one bank.

3. The construction described in claim 2 and in which the conveyors of the second bank are below the level of the conveyors of the first bank from which the products are transferred and a conveyor guide portion comprises a vertical belt, drive means, off-set roller means for said belt, and a vertical frame mounting having a flange extending parallel to the outer portion of said belt.

4. The construction described in claim 2 and in which the said off-set means for delivering the products from the lowermost section is at the opposite end of the apparatus from the said off-set means conveying the products to the uppermost section of the first bank.

5. The construction described in claim 2 and in which the conveyor guide means for transferring the products comprise stacked series of rotating discs in vertical alignment at opposite ends of said superimposed conveyor sections and bakery product end aligning conveyor means in series stacked relationship with said discs.

6. The construction described in claim 2 and including aligning means for propelling the bakery products from said transferring means to said conveyor sections with the longitudinal axis thereof at right angles to the direction of travel of said conveyor sections.

7. An apparatus for cooling loaves of bread, the apparatus including in combination a bank of superimposed conveyor sections travelling in the same direction, a second bank of conveyor sections in superimposed relation parallel to the first bank, transferring bread aligning and propelling means for transferring the loaves from the uppermost section of one bank to the uppermost section of the second bank, further aligning and propelling means transferring the loaves from the uppermost section of the second bank to the second uppermost conveyor of the first bank, additional aligning and propelling means transferring the loaves from the remaining conveyor sections of the first bank to corresponding conveyor sections of the second bank and other aligning and propelling means for transferring the loaves from the remaining conveyors of the second bank to the next lower conveyor of the first bank, auxiliary off-set conveyor and bread aligning conveyor means delivering the loaves to the uppermost conveyor section of the first bank, and further auxiliary off-set conveyor and bread aligning conveyor means delivering loaves from the lowermost conveyor section.

8. The apparatus described in claim 7 and including temporary contacting bread loaf retarder and propelling means for straightening the loaves between conveyor sections.

9. The construction described in claim 8 and including flexible retarder and bread loaf propelling means in sequence for swinging the loaves to a position with their longitudinal axes at right angles to the direction of travel.

10. The construction described in claim 7 and including freely flexible curtain means in the path of movement of said loaves for swinging the loaves into right angular relation to the direction of travel of the loaves.

11. An apparatus for cooling loaves of bread including in combination a first bank of conveyor sections in superimposed relation travelling in the same direction, a second bank of conveyor sections parallel to the first bank and in superimposed relation, the conveyors of the second bank travelling in the opposite direction from the conveyors of the first bank, aligned stacks of rotating discs at the ends of said banks for transferring the loaves from the conveyor sections of one bank to the next lower conveyor section of the other bank, bread loaf retarding and axis aligning contact means associated with said discs, means delivering the loaves to the uppermost conveyor section of one bank and means delivering the loaves from the lowermost conveyor section.

12. The construction described in claim 11 and including chute means associated with said bread loaf retarding means at the end of each conveyor section directing the loaves to each of the associated discs.

13. The construction described in claim 12 and including free swinging loaf straightening means engaging the tops of the loaves delivered to said discs to move them into substantially radial position on the said discs.

14. An apparatus for cooling loaves of bread including a first bank of conveyor sections in superimposed relation travelling in the same direction, a second bank of conveyor sections parallel to the first bank and in superimposed relation, the conveyors of the second bank travelling in the opposite direction from the conveyors of the first bank, rotating discs at the ends of said banks for transferring the loaves from the conveyor sections of one bank to the next lower conveyor section of the other bank, guide belt means engaging the ends of the loaves nearest the axis of rotation of said discs for propelling the loaves toward the next conveyor section, and means delivering the loaves to the uppermost conveyor section of one bank and means delivering the loaves from the lowermost conveyor section.

15. An apparatus for cooling loaves of bread including a first bank of conveyor sections in superimposed relation travelling in the same direction, a second bank of conveyor sections parallel to the first bank and in superimposed relation, the conveyors of the second bank travelling in the opposite direction from the conveyors of the first bank, rotating discs at the ends of said banks for transferring the loaves from the conveyor sections of one bank to the next lower conveyor section of the other bank, a guide belt supported on substantially vertical axes engaging the ends of the loaves most closely adjacent the axis of rotation of said discs and moving in a direction to propel the loaves from said discs to the adjoining conveyor sections, and means delivering the loaves to the uppermost conveyor section of one bank and means delivering the loaves from the lowermost conveyor section.

16. An apparatus for cooling bakery products including in combination a first series of conveyor sections arranged in superimposed relation and a series of conveying members in stacked off-set and parallel relationship for delivering hot bakery products to said superimposed sections, the sections travelling in the same direction, a second series of superimposed conveyor sections substantially parallel to the first series and travelling in the opposite direction, a plurality of second transferring means in stacked parallel relationship for transferring products from the ends of the conveyor sections of the first series to the conveyor sections of the second series, said second transferring means including an off-set conveyor member for delivering the cooled bakery products from the lowermost conveyor section of said cooling apparatus, auxiliary conveyor members associated with each of said conveying members and transfer members for axially aligning said bakery products on said conveyor sections, drive means for driving the conveyor sections of the first series and the first mentioned conveying members and independent drive means for operating the second series of conveyor sections and said second transferring means.

References Cited in the file of this patent

UNITED STATES PATENTS

| | | |
|---|---|---|
| 1,212,900 | Campbell | Jan. 16, 1917 |
| 1,345,301 | Winchester | June 29, 1920 |
| 1,489,926 | Burtchaell | Apr. 8, 1924 |
| 1,577,072 | Pardee | Mar. 16, 1926 |
| 2,550,526 | Braun | Apr. 24, 1951 |
| 2,583,707 | Prickett | Jan. 29, 1952 |
| 2,630,202 | Saxe | Mar. 3, 1953 |
| 2,677,198 | Doll | May 4, 1954 |
| 2,758,391 | Lanham | Aug. 14, 1956 |